United States Patent [19]

Oikawa et al.

[11] Patent Number: 4,831,011

[45] Date of Patent: May 16, 1989

[54] CARBON-BASED ADSORBENT AND PROCESS FOR PRODUCTION THEREOF

[75] Inventors: Yukio Oikawa, Kariya; Kunio Okamoto, Okazaki; Takahiro Shibakawa, Kariya, all of Japan

[73] Assignee: Nippondenso Co., Ltd., Kariya, Japan

[21] Appl. No.: 231,482

[22] Filed: Aug. 12, 1988

Related U.S. Application Data

[63] Continuation of Ser. No. 7,014,617, Feb. 13, 1987, abandoned.

[30] Foreign Application Priority Data

Feb. 17, 1986 [JP] Japan ............................ 61-33410

[51] Int. Cl.$^4$ ..................... C01B 31/12; B01J 20/20
[52] U.S. Cl. ............................ 502/406; 55/74; 422/5; 423/239; 502/417; 502/418
[58] Field of Search ............... 502/406, 417, 425, 433, 502/182, 183, 185, 418, 180, 181

[56] References Cited

U.S. PATENT DOCUMENTS

| | | | |
|---|---|---|---|
| 3,702,832 | 11/1972 | Ermolenko et al. | 502/417 |
| 4,158,643 | 6/1979 | Sinha | 502/185 |
| 4,256,607 | 3/1981 | Yoshida et al. | 502/425 |
| 4,259,304 | 3/1981 | Steiner | 502/417 |
| 4,285,831 | 8/1981 | Yoshida et al. | 502/185 |
| 4,362,646 | 12/1982 | Ikegami et al. | 502/185 |

FOREIGN PATENT DOCUMENTS

| | | | |
|---|---|---|---|
| 3013256 | 10/1981 | Fed. Rep. of Germany | 502/417 |
| 50886 | 12/1980 | Japan | 502/433 |
| 2106010 | 4/1983 | United Kingdom . | |

OTHER PUBLICATIONS

English Abstract of Japanese Patent Application Kokai No. 53-119324.

*Primary Examiner*—Paul E. Konopka
*Attorney, Agent, or Firm*—Cushman, Darby & Cushman

[57] ABSTRACT

A carbon-based adsorbent comprising active carbon provided with electron-donative surface functional groups which are bonded directly and chemically to graphite constructing the surface of the active carbon and are coordinated with metallic ions to form chelate structures, which has adsorbing power similar to that of common active carbon and additionally the ability to remove specific harmful gas molecules and smelling gas molecules from air, thus being especially effective for gas filters.

7 Claims, 1 Drawing Sheet

CARBON-BASED ADSORBENT AND PROCESS FOR PRODUCTION THEREOF

This is a continuation of application Ser. No. 07/014,617, filed Feb.13, 1987, which was abandoned upon the filing hereof.

BACKGROUND OF THE INVENTION

1. Field of the Invention

The present invention relates to a carbon-based adsorbent comprising active carbon and metallic ions supported on the surface (including internal surfaces) of the active carbon. This adsorbent has adsorbing power similar to that of common active carbon and additionally the ability to remove specific harmful gas molecules and smelling gas molecules from air, thus being especially effective for gas filters.

2. Description of the Prior Art

Having extremely large specific surface area and numerous fine pores in the surface region, active carbon adsorbs gas molecules to great extents and hence is useful as an adsorbent for removing various kinds of gas molecules. However, it cannot be said that active carbon is satisfactory in such functions as that of decomposing or removing ozone contained in exhaust gases and that of adsorbing molecules of ammonia, aldehydes, amines, and the like which are responsible for disagreeable smells.

On the other hand, it is known that transition metal catalysts, e.g. Mn catalysts, are effectively used for decomposing ozone.

Based on such technical background, Japanese Patent Application Laid-Open No. 24340/83, for example, has proposed an adsorbent having active carbon functions combined with said metallic function, which is prepared by coordinating a chelating agent such as ethylenediaminetetraacetic acid (EDTA) with a metal to stabilize it, and causing active carbon to support this chelating compound on the surface.

However, it has been revealed from the present inventors' experimental study that in the invention of the above patent application, most of the used chelating agents have large molecular volumes and hence the whole pore volume of active carbon, when its surface is covered with the resulting chelate compound, is reduced as much as corresponding to the volume of the covering chelate compound, thus lowering the adsorption capacity of the adsorbent. As shown in FIG. 2 of the accompanying drawings, a great number of pores P of about 10–100 Å in size are generally distributed in the surface region of active carbon. The whole volume of these pores, contributing to the adsorption capacity, will be decreased to a great extent by introducing a chelating agent having a large molecular volume.

As examples of the adsorbing power of active carbon fibers (ACF) when a chelate compound is introduced into pores of the fibers, Table 1 shows the specific surface area, benzene-adsorption capacities and ammoniaadsorption capacities of adsorbents prepared by dipping ACF for about 10 minutes in each of L-ascorbic acid-$Fe^{II}$ chelate solutions of from 1 to 10% varying concentrations, followed by air-drying the fibers, together with the same characteristics of the untreated ACF.

TABLE 1

|  | Concentration (%) of chelate solution | | | | |
|---|---|---|---|---|---|
|  | 0 | 1 | 2 | 5 | 10 |
| Specific surface area (m²/g) | 1110 | 550 | 240 | ≈0 | ≈0 |
| Benzene adsorption capacity (m mol/g) | 4.1 | 1.9 | 0.8 | 0.1 | ≈0 |
| Ammonia adsorption capacity (m mol/g) | 0.1 | 2.5 | 2.1 | 0.8 | 0.5 |

As shown in Table 1, the impregnation of ACF with the chelate compound decreases the specific surface area of the ACF. In consequence, the capacity of physical adsorption inherent in ACF is detracted remarkably when ACF is treated with the chelate solutions of such concentrations that the improvement of ACF in ammoniaadsorption capacity is observed.

SUMMARY OF THE INVENTION

Accordingly, it is the primary object of the present invention to provide a carbon-based adsorption for solving the above noted problem and a process for producing such an adsorbent. This adsorbent comprises active carbon provided with electron-donative surface functional groups which are directly and chemically bonded to graphite constructing the surface of the active carbon and are coordinated with metallic ions to form chelate structures.

According to the present invention, electron-donative surface functional groups acting as a chelating agent are directly bonded to graphite constructing the surface of active carbon and coordinated with metallic ions to form chelate structures wherein the functional groups are directly bonded to internal walls of the pores. Therefore, the chelating agent has a small molecular volume, hence little decreasing the pore volume.

BRIEF DESCRIPTION OF THE DRAWINGS

In FIG. 1, G represents graphite; A represents a surface functional group and M is a metallic ion.

DETAILED DESCRIPTION OF THE INVENTION

Now, the carbon-based adsorbent of the present invention is illustrated in detail with reference to its examples. To facilitate the understanding of the invention, the process for producing the adsorbent is described before its structure.

Figure 1:
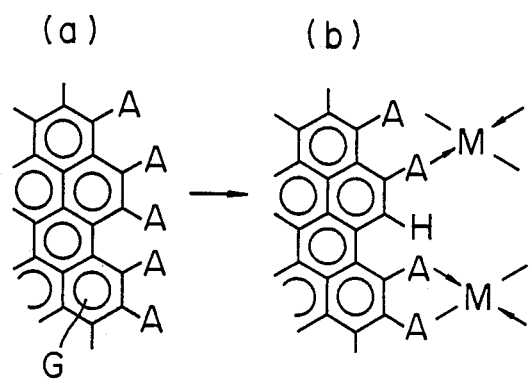
FIG. 1 is a schematic illustration of superficial chemical structures formed in the process for producing a carbon-based adsorbent of the present invention.
Figure 2:
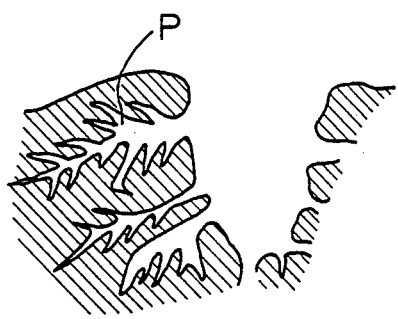
FIG. 2 is a cross-sectional view of active carbon showing its surface geometry.

In the first place, treatment of active carbon with each of ozone, hydrogen peroxide, and sulfuric acid was tried as the first step operation of the present production process to form-surface functional groups. That is, portions of an active carbon having a specific surface area of 1150 m²/g, as measured by the BET method that is generally known, were subjected severally to treatments, as shown in Table 2, of about 15 minutes' exposure to each of nitrogen gases of 2800 and 8000 ppm ozone contents, about 10 hours' immersion in each of 15 and 30% aqueous hydrogen peroxide solutions, and about 1 hour's immersion in each of 7- and 37-N concentrated sulfuric acids. Analysis of the thus treated active carbons by using a Fourier-transformation infrared spectrophotometer (FT-IR) confirmed the presence of absorption maxima ascribed to hydroxyl groups (—OH) and carbonyl groups (>C=O), respectively. This suggests that surface functional groups A, according to the present invention, including hydroxy groups (—OH), carboxyl groups (—COOH), and formyl groups or aldehyde groups (—CHO) are formed, as shown in FIG. 1(a), on graphite constructing the surface of the active carbon. In the case of the sulfuric acid treatment, the formation of sulfo groups (—SO$_3$H) was observed. Table 2 shows results of measuring the specific surface areas and benzene-adsorption capacities of the treated active carbons and of the untreated active carbon.

TABLE 2

|  | Untreated | Treated with ozone | | Treated with hydrogen peroxide | | Treated with sulfuric acid | |
| --- | --- | --- | --- | --- | --- | --- | --- |
|  |  | 2800 ppm × 0.25 H | 8000 ppm × 0.25 H | 15% × 10 H | 30% × 10 H | 7N × 1 H | 37N × 1 H |
| Specific surface area (m$^2$/g) | 1150 | 1080 | 830 | 1100 | 1010 | 1090 | 860 |
| Benzene adsorption capacity (m mol/g) | 4.2 | 4.0 | 2.7 | 4.2 | 3.9 | 3.9 | 2.8 |

As are evident from Table 2, the treatment under too severe oxidizing conditions decreases the specific surface area and this is accompanied by much decrease in the benzene adsorption capacity, and suitable concentrations of each agent are up to 3000 ppm of ozone for the ozone treatment, up to 30% of hydrogen peroxide for hydrogen peroxide treatment, and up to 10 N of sulfuric acid for the sulfuric acid treatment.

In the next place, the treated active carbons were pyrolyzed and the evolved gases were analyzed. That is, each active carbon subjected to oxiding treatment was degassed in vacuo at 120° C. and then further heated in a stream of He serving as a carrier gas from 120° to 950° C. at a rate of 2° C./min. Meanwhile the decomposition product gas was collected at 50° C. intervals and concentrations of its component gases were determined. The product gas was composed mainly of CO, CO$_2$, and H$_2$O. The three kinds of treated active carbons were different from one another in the CO$_2$ and H$_2$O generation temperatures and in the peak value of CO in the gas-chromatography. This suggests that these treated active carbons are dissimilar in the state of surface oxidation. Moreover, data of the analysis with FT-IR and the pattern of gas evolution resulting from the pyrolysis suggest that the ozone treatment formed a large number of structures having neighboring pairs of —OH and —CHO groups and neighboring pairs of —CHO and —CHO groups, on graphite constructing the surface of the active carbon, and that the hydrogen peroxide treatment formed a large number of structures having neighboring pairs of —OH and —COOH groups and neighboring pairs of —COOH and —COOH groups.

In the second step of the adsorbent production process according to the present invention, a metallic ion solution is caused to adhere to the above-treated active carbon as follows: Metallic ions chosen herein Fe$^{II}$ ions, which are capable of combining, in their coordination ranges, with molecules of common airborne smelling gases such as ammonia, amines, and aldehydes and thereby are capable of adsorbing them, hence being used as a deodorant. An Fe$^{II}$ solution was prepared by dissolving FeCl$_2$ in water to a concentration of 50 g/l and filtering once the resulting liquid through ordinary filter paper to remove insoluble Fe$^{II}$ hydroxide and other precipitates. The above-treated active carbon was immersed in the Fe$^{II}$ solution and the whole system was put under a vacuum of 5 mm H$_2$O to eliminate bubbles adherent to the surface of the active carbon and was allowed to stand for 30 minutes with the active carbon surface being in complete contact with the solution. Then the active carbon was taken out of the solution and heated in a nitrogen atmosphere at 120° C. to evaporate and remove the solvent. This operation is of the third step of the production process.

As shown in FIG. 1(b), the active carbon resulting from the above steps has structure wherein electron-donative functional groups A such as —OH, —COOH, and —CHO groups are bonded to graphite constructing the surface of the active carbon and are coordinated with Fe$^{II}$ ions (denoted by M).

Fe$^{II}$ ions are capable of removing smelling gas molecules of ammonia, aldehydes, amines, and the like by coordinating these molecules in the cordination ranges around themselves, hence acting as a powerful deodorant. However, Fe$^{II}$ on oxidation into Fe$^{III}$ loses the deodorizing power. In the active carbon treated in the above described way, functional groups adjoining to Fe$^{II}$ and bonding chemically to surface graphite of the active carbon act as chelate ligands, stabilizing the Fe$^{II}$ to prevent the oxidation of the Fe$^{II}$. Thus, smelling gas molecules in air can be removed steadily, with the present adsorbent, which therefore can be used effectively, for example, in deodorizing filters of automotive or household air cleaners.

Subsequently, experiments were conducted to compare adsorption effects of the active carbon, selected from those of the above examples, which was treated with 2800 ppm of ozone and then with the Fe$^{II}$ solution, with adsorption effects of the active carbon not subjected at all to any treatment. Results of the experiments are shown in Tables 3 and 4.

Table 3 shows amounts of six kinds of smelling gases: benzene, diethylamine, ammonia, methylamine, hydrogen sulfide, and nitrogen dioxide, adsorbed severally by each of the active carbons to saturation and amounts of the gases desorbed thereafter.

TABLE 3

|  |  | Benzene | Diethylamine | Ammonia | Methylamine | Hydrogen sulfide | Nitrogen dioxide |
| --- | --- | --- | --- | --- | --- | --- | --- |
| Adsorption amount | Treated | 4.0 | 4.0 | 5.9 | 4.9 | 2.8 | 1.8 |
|  | Untreated | 4.0 | 3.8 | 0.1 | 1.5 | 1.5 | 1.3 |

TABLE 3-continued

|  |  | Benzene | Diethyl-amine | Ammonia | Methyl-amine | Hydrogen sulfide | Nitrogen dioxide |
|---|---|---|---|---|---|---|---|
| (m mol/g) Desorption amount (m mol/g) | Treated | 0.7 | 0.5 | 1.3 | 1.0 | 0.7 | 0.5 |
|  | Untreated | 1.3 | 1.3 | 0.1 | 1.3 | 1.1 | 1.1 |

As can be seen from Table 3, the active carbon treated according to the present invention is markedly improved in the ability to adsorb ammonia, methylamine, and hydrogen sulfide.

Table 4 shows results of tests conducted in the manner that air containing each of smelling gases (ammonia:2000 ppm; acetaldehyde, methylamine:50 ppm each; benzene, diethylamine:100 ppm each) was passed through a column packed with each of the same treated active carbon of the invention and the same untreated active carbon as tested above at a flow rate of 2 l/min and the concentration of the smelling gas in the exit gas was measured continuously to determine the time during which 100% removal of the smelling gas was retained; after the adsorption had reached complete saturation (the smelling gas concentration in the exit gas had become equal to that in the feed gas), the feed of the gas was stopped and $N_2$ gas was introduced to effect desorption and the degree of desorption (amount of desorbed gas/amount of adsorbed gas) was determined.

TABLE 4

|  |  |  | Ammonia | Acet-aldehyde | Methyl-amine | Diethyl-amine | Benzene |
|---|---|---|---|---|---|---|---|
| Adsorption performance characteristics | 100% removal period (min) | Untreated | 1 | 2 | 7 | 65 | 90 |
|  |  | Treated | 30 | 10 | 36 | 70 | 95 |
|  | Ease of removal (above-period ratio of treated to untreated) |  | 30 | 5 | 5 | 1 | 1 |
| Desorption performance Characteristic | Degree of desorption (%) | Untreated | 100 | 100 | 100 | 33 | 10 |
|  |  | Treated | 4 | 30 | 0.6 | 33 | 1 |
|  | Difficulty of desorption (above-degree ratio of untreated to treated) |  | 25 | 3.3 | 166 | 1 | 10 |

As is apparent from Table 4, the treated active carbon of the invention exhibits removal ability of 30 times for $NH_3$ and 5 times for $CH_3CHO$ and for $CH_3NH_2$, as high as that of the untreated active carbon and gases adsorbed on the treated active carbon are hard to desorb.

In the present invention, acceptable functional groups include hydroxyl (—OH), carboxyl (—COOH), formyl (—CHO), carbonyl (>C=O) and in addition, —O—, —COOR, —CONH$_2$, —NO, —NO$_2$, —SO$_3$H, —PHO(OH), —AsO(OH)$_2$, —NH$_2$, >NH, —N=N—, >C=N—CONH$_2$, >C=N—OH, >C=NH, —SH, —S—, >C=S, —COSH, and —X groups (X: halogen). Treatments other than the oxidation treatment illustrated in the above examples are possible to form surface functional groups. That is, nitrogen-containing functional groups can be introduced by heat treatment of active carbon in an atmosphere of ammonia gas to cause nitride-forming reaction of graphite constructing the surface of the active carbon (details of this method are described in Japanese Patent Publication No. 54406/85). Moreover, nitrogen- and oxygen-containing functional groups such as —CONH$_2$ and >C=N—OH can be introduced by reacting an oxidation-treated active carbon with ammonia or by subjecting active carbon to nitride-forming treatment followed by oxidizing treatment.

Raw material active carbons for the carbon-based adsorbent of the present invention are not limited to conventional granular ones; the raw material active carbons may be fibrous ones including active carbon fibers produced according to the known method. These active carbon fibers are produced by oxidizing treatment of such fibers as polyacrylonitrile fibers, cellulosic fibers, pitch fibers, or phenolic resin fibers, followed by activating treatment of the resulting fibers using an activating gas, e.g. steam, carbon dioxide, or ammonia gas at a temperature of about 700° to 1300° C. (details of this method are described in British Pat. No. 1,549,759 and German Pat. No. 2,715,486). In this activating treatment, surface functional groups such as hydroxyl groups are produced occasionally. Hence, this activating treatment may be performed sufficiently instead of carrying out the above described treatment according to the present invention for the formation of surface functional groups.

Metallic ions used in the invention may be those, including $Fe^{II}$ ions, having deodorizing ability and in addition, may be those, such as Mn and Cu ions, having ozone-decomposing ability. Moreover, all the metallic ions can be used that can accept electron-donative ligands in their coordination ranges to form chelate compounds. Such metallic ions include those of transition elements, lanthanoids, and elements of groups IIa and IIb of the periodic table.

According to the present invention, as described hereinbefore, surface functional groups are formed to combine directly and chemically with graphite which constructs the surface of active carbon and metallic ions are held in the form of chelate structures together with these functional groups. Therefore, it is possible, with the pore volume decreased scarcely, to provide carbon-based adsorbents having high adsorption capacity as well as additional functions including various catalytic functions and deodorizing functions.

What is claimed is:

1. A carbon-based adsorbent comprising active carbon provided with electron-donative surface functional groups selected from the group consisting of hydroxyl (—OH), carboxyl (—COOH), formyl (—CHO), and carbonyl (>C=O) groups which are bonded directly and chemically to graphite constructing the surface of the active carbon and are coordinated with metallic ions to form chelate structures, said carbon-based adsorbent being formed by a process which comprises a step including a treatment of the active carbon for forming electron-donative surface functional groups selected from the group consisting of hydroxyl (-OH), carboxyl (-COOH), formyl (—CHO), and carbonyl (>C=O) groups to bond them directly and chemically to the graphite which constructs the surface of the active carbon, wherein said treatment is an oxidizing treatment comprising exposure of the active carbon to ozone or immersion of the active carbon in an aqueous hydrogen peroxide solution or a solution of sulfuric acid, the step of immersing the treated active carbon in a solution containing metallic ions to cause a part of the solution to adhere to the surface of the active carbon, and the step of evaporating the solvent from the adhering solution, said metallic ions having the ability to adsorb smelling gas molecules, thus having a deodorizing effect.

2. The carbon-based adsorbent of claim 1, wherein the metallic ions are $Fe^{II}$ ions.

3. The carbon-based adsorbent of claim 1, wherein the treatment is with ozone having a concentration of up to 3000 ppm.

4. The carbon-based adsorbent of claim 1, wherein the treatment is with hydrogen peroxide having a concentration of up to 30%.

5. The carbon-based adsorbent of claim 1, wherein the treatment is with sulfuric acid having a concentration of up to 10 N.

6. A process for producing a carbon-based adsorbent, which comprises a step including a treatment of active carbon for forming electron-donative surface functional groups selected from the group consisting of hydroxyl (—OH), carboxyl (—COOH), formyl (—CHO), and carbonyl (>C=O) groups to bond them directly and chemically to graphite which constructs the surface of the active carbon, wherein said treatment is an oxidizing treatment comprising exposure of the active carbon to ozone or immersion of the active carbon in an aqueous hydrogen peroxide solution or a solution of sulfuric acid, the step of immersing the treated active carbon in a solution containing metallic ions to cause a part of the solution to adhere to the surface of the active carbon, and the step of evaporating the solvent from the adhering solution, said metallic ions having the ability to adsorb smelling gas molecules, thus having a deodorizing effect.

7. The process for producing the carbon-based adsorbent of claim 6, wherein the metallic ions are $Fe^{II}$ ions.

* * * * *